United States Patent
Showalter

[11] Patent Number: 6,105,702
[45] Date of Patent: *Aug. 22, 2000

[54] ADAPTIVE VEHICLE DRIVE METHOD FOR EXTREME OPERATING CONDITIONS

[75] Inventor: Dan J. Showalter, Plymouth, Mich.

[73] Assignee: BorgWarner Inc., Troy, Mich.

[ * ] Notice: This patent is subject to a terminal disclaimer.

[21] Appl. No.: 09/431,509

[22] Filed: Nov. 1, 1999

Related U.S. Application Data

[62] Division of application No. 08/996,805, Dec. 23, 1997, Pat. No. 5,980,415, which is a division of application No. 08/570,450, Dec. 11, 1995, Pat. No. 5,704,444.

[51] Int. Cl.$^7$ .................................................. B60K 23/08
[52] U.S. Cl. ............................ 180/247; 180/249; 477/35
[58] Field of Search .............................. 477/35; 180/233, 180/247, 248, 249

[56] References Cited

U.S. PATENT DOCUMENTS

| | | | |
|---|---|---|---|
| 4,417,641 | 11/1983 | Kageyama | 180/247 |
| 4,718,303 | 1/1988 | Fogelberg | 74/710 |
| 4,937,750 | 6/1990 | Gilliam | 364/424 |
| 4,989,686 | 2/1991 | Miller et al. | 180/197 |
| 5,002,147 | 3/1991 | Tezuska et al. | 180/197 |
| 5,060,747 | 10/1991 | Eto | 180/197 |
| 5,090,510 | 2/1992 | Watanabe et al. | 180/197 |
| 5,275,252 | 1/1994 | Sperduti et al. | 180/197 |
| 5,366,041 | 11/1994 | Shiraishi et al. | 180/248 |
| 5,407,024 | 4/1995 | Watson et al. | 180/248 |
| 5,485,894 | 1/1996 | Watson et al. | 180/248 |
| 5,492,194 | 2/1996 | McGinn et al. | 180/233 |
| 5,584,776 | 12/1996 | Weilant et al. | 475/213 |
| 5,609,219 | 3/1997 | Watson et al. | 180/248 |
| 5,704,444 | 1/1998 | Showalter | 180/247 |
| 5,819,194 | 10/1998 | Hara et al. | 701/89 |
| 5,980,415 | 11/1999 | Showalter | 475/213 |

*Primary Examiner*—Khoi Q. Ta
*Attorney, Agent, or Firm*—Brinks, Hofer, Gilson & Lione; Greg Dziegielewski

[57] ABSTRACT

An adaptive torque control and distribution system for a motor vehicle having a transfer case, primary driveline and drive wheels and secondary driveline and drive wheels for operation in extreme off road conditions such as sand. The transfer case includes a modulating clutch and a lockup clutch disposed in parallel between its primary (rear) output and secondary (front) output. The system detects abnormally high magnitude and rapidly repeating wheel spin transients which are characteristic of operation in sand or similar highly randomly variable tractive conditions and overrides the on demand torque distribution program for a predetermined time interval. During this predetermined time interval, the transfer case lockup clutch is activated thereby coupling the primary and secondary drivelines and achieving a fifty-fifty torque split therebetween while the modulating clutch is inactive. The system and this operating mode reduces clutch and clutch operator cycling thereby reducing heat generation within the transfer case and increasing clutch and transfer case longevity.

20 Claims, 5 Drawing Sheets

ADAPTIVE VEHICLE DRIVE METHOD FOR EXTREME OPERATING CONDITIONS

This application is a divisional application of Ser. No. 08/996,805, filed Dec. 23, 1997 now U.S. Pat. No. 5,980,415, granted Nov. 9, 1999 which, in turn, is a divisional application of Ser. No. 08/570,450, filed Dec. 11, 1995 now U.S. Pat. No. 5,704,444 granted Jan. 6, 1998.

BACKGROUND OF THE INVENTION

The invention relates to an adaptive vehicle drive system which shifts from two-wheel drive to four-wheel drive upon sensing certain conditions, and more specifically to an adaptive system which detects high magnitude and rapid repetition wheel spin transients and shifts to four wheel drive operation for a predetermined time period.

The performance advantages of four-wheel vehicle drive systems are well recognized. Improved vehicle stability while traversing rain soaked or ice or snow covered highways, handling and control on gravel or uneven pavement and simply maintaining traction in off road situations are all readily acknowledged benefits. Concomitant and less desirable attributes of four-wheel drive systems relate to reduced gas mileage from increased drive line friction and increased vehicle weight. Such increased drive line friction occurs in part time four-wheel drive systems which rotationally couple the front and rear vehicle propshafts. Such vehicle weight increases are particularly pronounced if the system is designed with a differential between the front and rear drive shafts for full-time engagement and operation rather than intermittent operation when conditions specifically demand it.

Furthermore, while part time four-wheel drive systems which lock the front and rear propshafts together provide obvious benefits of traction and stability in straight line driving, the disparity between the ground speed at the front wheels and the ground speed at the rear wheels during cornering can itself result in wheel slip and hopping of the vehicle. Thus, allowing the front and rear output shafts of the transfer case to operate at different speeds during cornering is beneficial.

Many four-wheel drive systems employing diverse control and torque distribution strategies have been designed and utilized. These various approaches are embodied in United States patents.

For example, U.S. Pat. No. 4,417,641 teaches a four-wheel drive system having an electromagnetic clutch and steering sensor. When the steering wheels are turned greater than a predetermined angle, the electromagnetic clutch is de-energized, disconnecting two drive wheels.

U.S. Pat. No. 4,718,303 discloses a transfer case having an electromagnetic ramp clutch which is modulated to adjust torque distribution in a full time four-wheel drive system. In U.S. Pat. No. 4,937,750, a microcomputer compares signals from front and rear driveline speed sensors. If the difference is greater than a certain value, a clutch is engaged to interconnect the front and rear drivelines.

U.S. Pat. No. 4,989,686 discloses a four-wheel drive system including wheel speed detectors. The detectors control a proportional clutch which delivers torque to whichever driveline is rotating more slowly. U.S. Pat. No. 5,002,147 discloses a four-wheel drive system which achieves torque splitting between the front and rear axles. The system utilizes four wheel speed sensors and a steering angle sensor.

In U.S. Pat. No. 5,060,747, a torque distribution system is taught which includes both vehicle and front and rear wheel speed sensors. Vehicle speed data is utilized to adjust the wheel speed difference value and this adjusted value is utilized to engage a clutch.

U.S. Pat. No. 5,090,510 discloses a four-wheel drive system having a differential and a hydraulic clutch disposed in parallel between the front and rear drive shafts.

A nearly universal problem of the foregoing active torque distribution systems is their operation in extreme off-road conditions, such as sand or mud, where randomly repeated, high magnitude speed difference transients repeatedly activate and deactivate the torque distribution clutch. Such operation is often justly characterized as unpleasant by the vehicle operator and occupants because of the abrupt, random and repeated cycling of the torque distribution clutch which is counter to the smooth, adaptive torque distribution goal of such systems. A control strategy that will recognize operation under such conditions and provide a smooth and comfortable operational solution to such conditions is therefore desirable.

SUMMARY OF THE INVENTION

An on demand four-wheel vehicle drive system monitors vehicle performance and operating conditions and inhibits proportioning torque distribution operation when certain operating parameters associated with severe operating conditions such as sand are detected.

The vehicle drive system includes a transfer case having primary and secondary output shafts driving primary and secondary drivelines, a plurality of speed sensors and a microcontroller. The speed sensors include a primary (rear) and secondary (front) driveline speed sensor and driveline status sensors. The secondary axle may include coupling components such as locking hubs or axle disconnects. The transfer case may either be a single speed device or may include a planetary gear assembly or similar device providing high and low speed ranges as well as neutral. The transfer case includes a modulating electromagnetic clutch controlled by the microcontroller which selectively transfers torque from the primary output shaft to the secondary output shaft. The transfer case also includes a locking clutch which is in mechanical parallel with the modulating clutch and may be activated to directly couple the primary output shaft to the secondary output shaft.

Selection of the on demand vehicle drive system both activates the secondary axle engaging components and may provide a minimum (standby) current to the modulating clutch which establishes a minimum torque transfer level. When the speed of one of the drive shafts overruns the speed of the other drive shaft by a predetermined value related to the vehicle speed and the identity of the overrunning shaft, indicating that wheel slip is present, clutch current is increased to increase clutch engagement and torque transfer to the secondary drive shaft until the speed difference between the drive shafts and thus wheel slip is reduced below the predetermined value. Reduction of the clutch current then occurs.

In extreme off road conditions, such as sand, the tractive conditions may vary rapidly and dramatically, causing the on demand drive system to cycle randomly, rapidly and repeatedly between substantially fully engaged and fully disengaged clutch positions. Such operation is less than acceptable not only to the driver and passengers but also to the driveline components which are subjected to accelerated wear. A microprocessor reads and computes both average driveline speed differences and speed transients which exceed predetermined values based upon the more slowly turning driveshaft speed. When these values are exceeded, the modulating clutch is fully activated and the lockup clutch is activated after which the modulating clutch is slowly relaxed. Typically the lockup clutch will remain engaged for a five minute interval. After the five minute interval, the lockup clutch is disengaged and system operation returns to normal on demand operation.

The on demand vehicle drive system may be an active full-time system, may be selectively activated by the vehicle operator or may be automatically activated by driving conditions. The system may be utilized with either primary front wheel or primary rear wheel drive configurations.

Thus it is an object of the present invention to provide an on demand system which is capable of detecting operation in extreme off road conditions such as sand.

It is a further object of the present invention to provide a vehicle drive system having both a modulating clutch which functions during normal on demand driving conditions and a lockup clutch which engages during extreme off road driving conditions.

It is a still further object of the present invention to provide a transfer case having parallel modulating and lockup clutches which provide modulating coupling between the primary and secondary output of the transfer case as well as providing lockup between such output while deactivating the modulating clutch.

It is a still further object of the present invention to provide an on demand vehicle operating system wherein the sensing of extreme off road operating conditions overrides the on demand torque distribution system and directly couples or locks up the primary and secondary drive lines for a predetermined period.

It is a still further object of the present invention to provide a vehicle drive system which may be utilized in either primary rear wheel drive or primary front wheel drive vehicle driveline configurations.

It is a still further object of the present invention to provide a control system for use with an on demand system to control a transfer case having modulating and lockup clutches disposed in parallel across the primary and secondary outputs.

Further objects and advantages of the present invention will become apparent by reference to the following Description of the Preferred Embodiment and appended drawings wherein like reference numerals designate the same components, elements or features.

DESCRIPTION OF THE PREFERRED EMBODIMENT

Part I-Mechanical Components

Figures 1, 5:
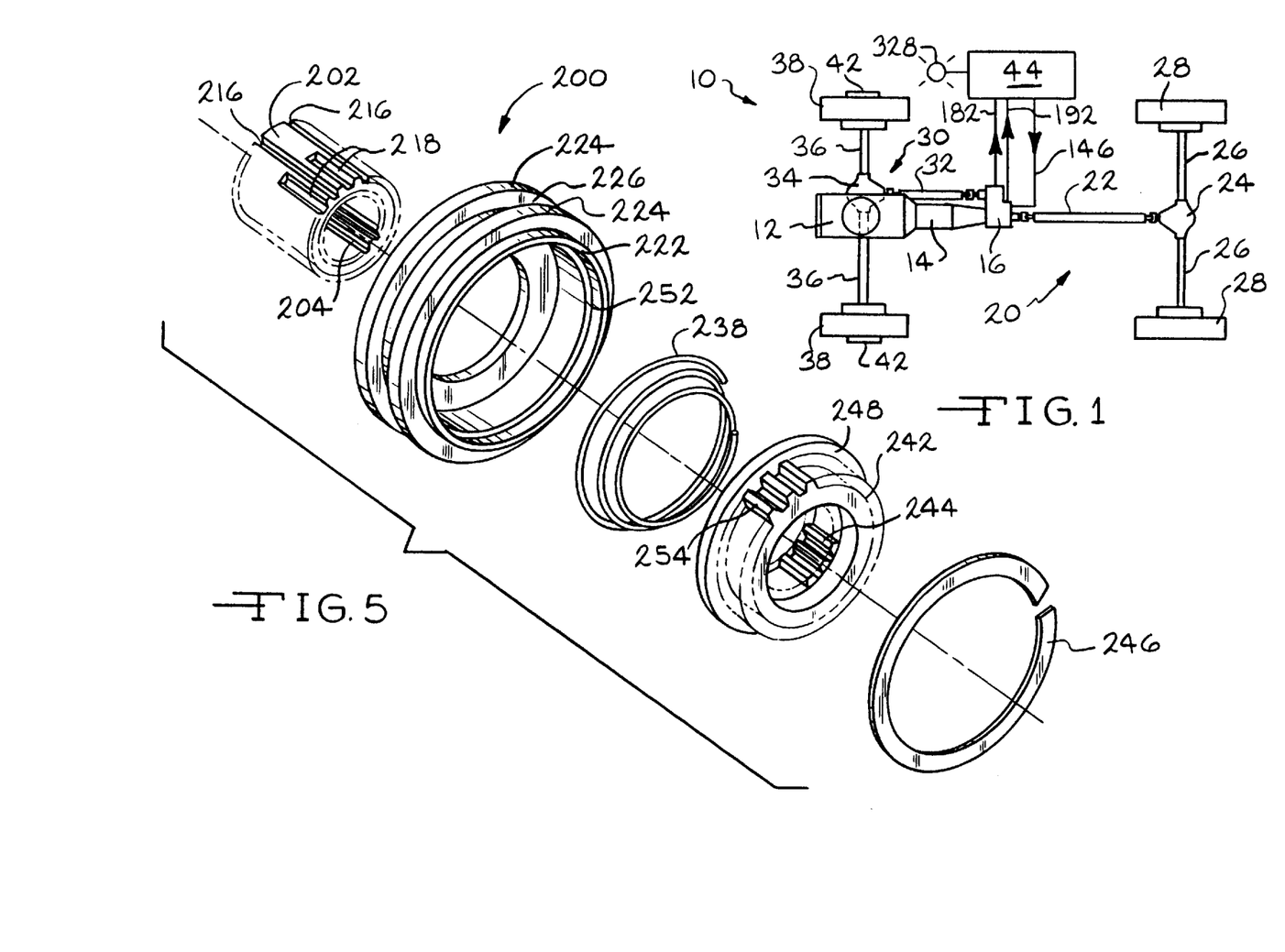
FIG. 1 is a diagrammatic plan view of the drive components and sensors of an on demand vehicle drive system according to the present invention.
FIG. 5 is an exploded perspective view of the lockup clutch in a transfer case according to the present invention.

Referring now to FIG. 1, an on demand vehicle drive system is illustrated and generally designated by the reference numeral 10. The on demand system 10 is incorporated into a vehicle having a prime mover, such an internal combustion engine 12, which drives a conventional transmission 14 which may either be a manual transmission with a clutch or an automatic transmission. The output of the transmission 14 is operably coupled to a transfer case assembly 16. In turn, the transfer case is operably coupled to and drives a rear or primary driveline 20 having a rear or primary drive shaft 22 which is operably coupled to and drives a rear or primary differential 24. The primary or rear differential 24 drives a pair of aligned primary or rear axles 26 which are coupled to primary or rear tire and wheel assemblies 28.

The transfer case assembly 16 also provides torque to a front or secondary driveline 30. The secondary driveline 30 includes a front or secondary drive shaft 32 which in turn drives the front or secondary differential 24. The secondary differential 24 operates in conventional fashion and provide drive torque through a pair of aligned front or secondary axles 36. A pair of front or secondary tire and wheel assembles 38 are disposed at the front of the vehicle. A pair of locking hubs 42 are operably disposed between a respective one of the front or secondary axles 36 and the front tire and wheel assemblies 38. The locking hubs 42 may be either remotely operated and thus include electrical or pneumatic operators or may be manually activated. Alternatively, front axle disconnects (not illustrated) may be housed within the front or secondary differential 34 and the axle disconnects may be activated or deactivated to couple or uncouple the secondary axles 36 from the output of the secondary differential 34.

The system 10 also include a microcontroller 44 having various programs and subroutines which receive various data from vehicle sensors and provide control outputs to achieve the design function and goals of the present invention which will be more fully described below.

It should be understood that the designations "primary" and "secondary" appearing both above and below refer to drivelines and driveline components in the system 10 which are primarily and secondarily intended to propel a vehicle. That is, in the system 10 illustrated, the inventor describes a vehicle which is commonly referred to as a rear wheel drive vehicle in which the rear tire and wheel assemblies 28 primarily from both a time and torque standpoint propel the vehicle. Hence, the secondary driveline 30 and the front or secondary tire and wheel assemblies 38 typically function intermittently, that is, on an as needed basis, to provide improved vehicle performance and stability in adverse driving conditions. It should be understood, however, that the operating components and method described herein are fully and equally usable and suitable for a vehicle wherein the primary driveline and tires are disposed at the front of the vehicle, that is, a vehicle commonly referred to as a front wheel drive vehicle, and the secondary driveline and tires are located toward the rear of the vehicle.

Figure 2:
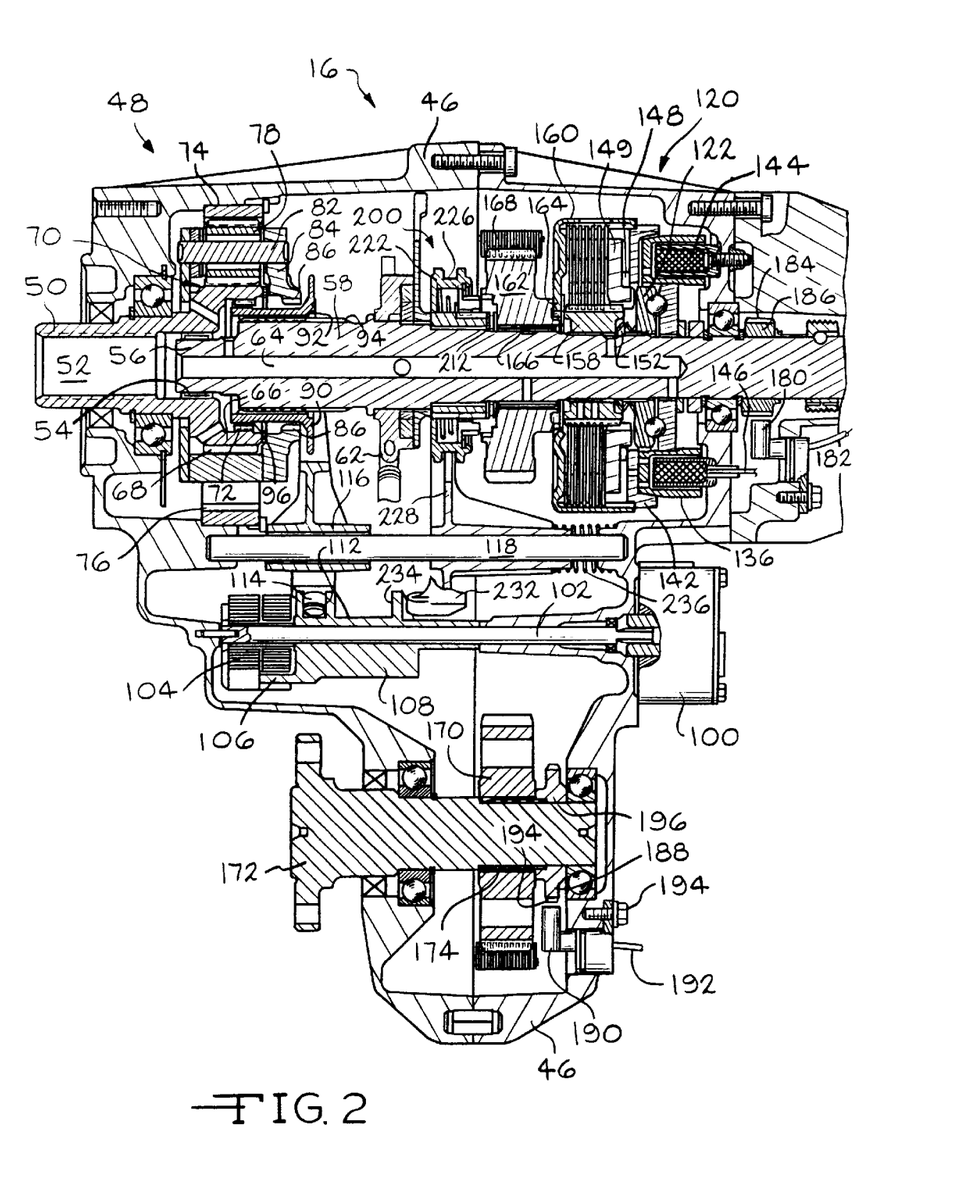
FIG. 2 is a full, sectional view of a transfer case and electromagnetic clutch assembly in an on demand system according to the present invention.
Figure 3:
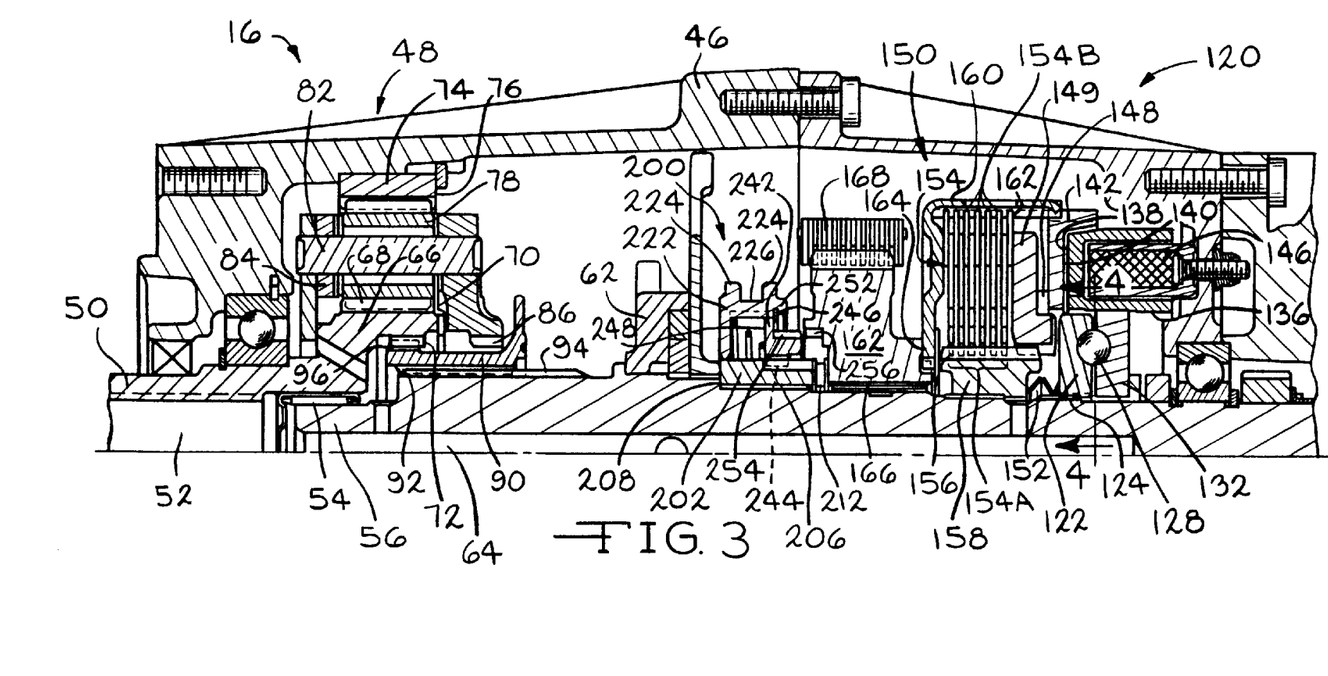
FIG. 3 is an enlarged, fragmentary sectional view of the electromagnetic clutch assembly in an on demand vehicle drive system according to the present invention.

Referring now to FIGS. 2 and 3, it will be appreciated that the transfer case assembly 16 includes a multiple part, typically cast, housing 46 having various openings for shafts and fasteners and various mounting surfaces and grooves for oil seals, bearings, seal retaining rings and other internal components as will be readily appreciated. The transfer case assembly 16 also includes a planetary gear assembly 48 which is driven by an input shaft 50 rotatably supported within the transfer case assembly 16. The input shaft 50 is coupled to and driven by the output of the transmission 14. The input shaft 50 defines a re-entrant bore 52 which receives a roller bearing assembly 54. The roller bearing assembly 54, in turn, receives and rotatably supports the forward terminus 56 of a rear (primary) output shaft 58. A gerotor pump 62 is secured about and rotates with the output shaft 58, providing lubricating fluid under pressure to a passageway 64 which extends axially within the output shaft 58 and distributes lubricating and cooling fluid to components of the transfer case assembly 16.

In the planetary gear assembly 48, the input shaft 50 defines an enlarged, bell-shaped region 66 having a plurality of external teeth 68 which define a sun gear 70. On the inner surface of the bell-shaped region 66 of the input shaft 50 are a plurality of female splines or gear teeth 72. Axially aligned with the sun gear teeth 68 is a ring gear 74 having a plurality of female splines or inwardly directed gear teeth 76. A plurality of pinion gears 78, one of which is illustrated in FIGS. 2 and 3 are rotatably received upon a like plurality of stub shafts 82 which are fixedly mounted within a carrier 84. The carrier 84 includes a plurality of inwardly directed female splines or gear teeth 86 on a surface generally axially adjacent but spaced from the internal gear teeth 72 defined by the input shaft 50. The planetary gear assembly 48 is more fully described in co-owned U.S. Pat. No. 4,440,042 which is herein incorporated by a reference.

An axially sliding, that is, dog type, clutch 90 is received about the output shaft 58. The dog clutch 90 defines an inwardly directed plurality of female splines or gear teeth 92 which are complimentary to and mate with a like plurality of external splines or male gear teeth 94 disposed about the periphery of the output shaft 58. The dog clutch 90 thus rotates with the output shafts 58 but may slide axially therealong. The dog clutch 90 includes a region of male splines or external gear teeth 96 which are complimentary to the teeth or splines 72 and 86 disposed on the input shaft 50 and the planetary gear carrier 84, respectively.

The dog clutch 90 is thus axially translatable between a first, forward position wherein the external teeth 96 couple with the gear teeth 72 and provide direct drive between the input shaft 50 and the output 58 and a second, rearward position, to the right in FIG. 2 wherein the dog clutch 90 engages the gear teeth 86 on the carrier 84 and provides a reduced speed drive between the input shaft 50 and the output shaft 58 in accordance with the gear ratio provided by the planetary gear assembly 48. A dog clutch 90 may also be moved to a third, neutral position mid-way between the forward, direct drive position and the rearward reduced speed drive position. In this middle position, the input shaft 50 is disconnected from the output shafts 58 and no torque is transferred therebetween. The position of the dog clutch 90 is commanded by an electric shift control motor 100. The electric shift control motor 100 rotates a drive shaft 102. The drive shaft 102 is suitably supported for rotation with the housing 46 of the transfer case assembly 16. The position of the drive shaft 102 may be monitored and read by an encoder assembly (not illustrated) which provides information about the current position of the drive shaft 102 and the dog clutch 90 to the microcontroller 40.

The drive shaft 102 terminates in and drives a spring assembly 104. The spring assembly 104 is wrapped about the drive shaft 102 and is also engaged by an arm 106 which extends axially from a cylindrical cam 108. The spring assembly 104 functions as a resilient coupling between the drive shaft 102 and the cylindrical cam 108 to absorb lag between the movement commanded by the drive motor 100 and the driven components so that the shift motor 100 is allowed to reach its final requested position. The spring assembly 104 allows smooth and fast response to a requested repositioning of the dog clutch 90 in situations where the gear teeth 96 of the dog clutch 90 do not instantaneously engage the internal teeth 72 of the input shaft 50 or the internal gear teeth 86 of the carrier 84. When relative rotation of the dog clutch 90 allows engagement of the aforementioned clutch teeth, potential energy stored in the spring assembly 104 rotates the cylindrical cam 108 to its requested position, thus completing the shift.

The cylindrical cam 108 defines a helical track 112 which extends approximately 270° about the cam 108. The helical track 112 receives a pin or cam follower 114 which is coupled to and translates a fork assembly 116. The fork assembly 116 is supported for bi-directional translation upon a fixed shaft 118 and engages the periphery of the dog clutch 90. Rotation of the shaft 102 axially repositions the cam follower 114 and axially positions the dog clutch 90 in one of the three positions described above. It will be appreciated that the planetary gear assembly 48 including the mechanism of the dog clutch 90 which provides dual range, i.e., high and low speed, capability to the transfer case assembly 16 is optional and that the vehicle drive system 10 is fully functional as a single speed direct drive unit and may be utilized without these components and the dual speed range capability provided thereby.

Figure 4:
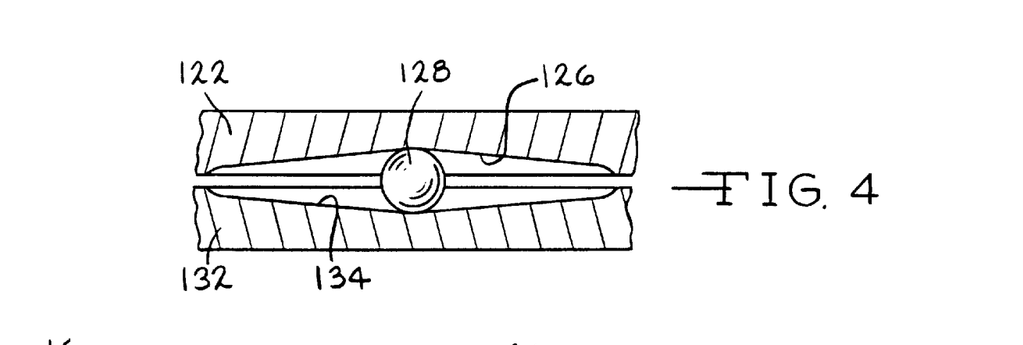
FIG. 4 is a flat pattern development of a section of one clutch ball and associated recesses incorporated in the electromagnetic clutch assembly taken along line 4—4 of FIG. 3.

The transfer case assembly 16 also includes an electromagnetically actuated disc pack type clutch assembly 120. The clutch assembly 120 is disposed about the output shaft 58 and includes a circular drive member 122 coupled to the output shaft 58 through a splined interconnection 124. The circular drive member 122 includes a plurality of circumferentially spaced apart recesses 126 in the shape of an oblique section of a helical torus, as illustrated in FIG. 4. Each of the recesses 126 receives one of a like plurality of load transferring balls 128.

A circular driven member 132 is disposed adjacent the circular drive member 122 and includes a like plurality of opposed recesses 134 defining the same shape as the recesses 126. The oblique side walls of the recesses 126 and 134 function as ramps or cams and cooperate with the balls 128 to drive the circular members 122 and 132 apart in response to relative rotation therebetween. It will be appreciated that the recesses 122 and 134 and the load transferring balls 128 may be replaced with other analogous mechanical elements which cause axial displacement of the circular members 122 and 132 in response to relative rotation therebetween. For example, tapered rollers disposed in complementarily configured conical helices may be utilized.

The circular driven member 132 extends radially outwardly and is secured to a electromagnetic coil housing 136. The coil housing 136 includes a face 138 which is disposed in opposed relationship with a clutch face 140 on an armature 142. The coil housing 136 surrounds an electromagnetic coil 144 on three sides.

The electromagnetic coil 144 is provided with electrical energy preferably from a pulse width modulation (PWM) control through an electrical conductor 146. The pulse width modulation scheme increases or decreases the average current to the electromagnetic coil 144 of the electromagnetic clutch assembly 120 and thus torque throughput by increasing or decreasing the on time (duty cycle) of a drive signal. It will be appreciated that other modulating control techniques may be utilized to achieve engagement and disengagement of the electromagnetic disc pack type clutch assembly 120.

Providing electrical energy to the electromagnetic coil 144 causes magnetic attraction of the armature 142 with the coil housing 136. This magnetic attraction results in frictional contact of the armature 142 to the coil housing 136. When the output shaft 58 is turning at a different speed than the armature 142 this frictional contact results in a frictional torque being transferred from the output shaft 58, through the circular drive member 122, through the load transferring balls 128 and to the circular driven member 132. The resulting frictional torque causes the balls 128 to ride up the ramps of the recesses 126 and 134, causing axial displacement of the circular drive member 122. Axial displacement of the circular drive member 122 translates a washer 148 and an apply plate 149 axially toward a disc pack clutch assembly 150. A compression spring 152 which may comprise a stack of Belleville washers provides a restoring force which biases the circular drive member 122 toward the circular driven member 132 and returns the load transferring balls 128 to center positions in the circular recesses 126 and 134 to provide maximum clearance and minimum friction between the components of the electromagnetic clutch assembly 120 when it is deactivated.

The disc pack clutch assembly 150 includes a plurality of interleaved friction plates or discs 154. A first plurality of discs 154A are coupled by interengaging splines 156 to a clutch hub 158 which is coupled to the output shaft 58 for rotation therewith. A second plurality of discs 154B are coupled to an annular housing 160 by interengaging splines 162 for rotation therewith. An important design consideration of the recesses 126 and 134 and the balls 128 is that the geometry of their design and the design of the washer 148, the compression spring 152 and the clearances in the disc pack assembly 150 ensure that the electromagnetic clutch assembly 120 is not self-locking. The electromagnetic clutch assembly 120 must not self-engage but rather must be capable of controlled, proportional engagement of the clutch discs 154 and torque transfer in direct response to the modulating control input.

The annular housing 160 is disposed for free rotation about the output shaft 58 and is coupled to a chain drive sprocket 162 by a plurality of interengaging splines or lugs and recesses 164. The chain drive sprocket 162 is also rotatably disposed on the output shaft 58 and is supported freely by a roller or needle bearing assembly 166. When the clutch assembly 120 is engaged, it transfers energy from the output shaft 58 to the chain drive sprocket 162. A drive chain 168 is received upon the chain drive sprocket 162 and engages and transfers rotational energy to a driven chain sprocket 170. The driven sprocket 170 is coupled to a front (secondary) output shaft 172 of the transfer case assembly 16 by interengaging splines 174.

The transfer case assembly 16 also includes a first Hall effect sensor 180 having an output line 182 which is disposed in proximate, sensing relationship with a plurality of teeth 184 on a tone wheel 186 which is coupled to and rotates with the rear (primary) output shaft 58. A second Hall effect sensor 190 has an output line 192 and is disposed in proximate, sensing relationship with a plurality of teeth 194 of a tone wheel 196 disposed adjacent the driven sprocket 170 on the front output shaft 172. Preferably, the number of teeth 184 on the tone wheel 186 is identical to the number of teeth 194 on the tone wheel 196 so that identical shaft speeds result in the same number of pulses per unit time from the Hall effect sensors 180 and 190. This simplifies computations relating to shaft speeds and improves the accuracy of all logic decisions based on such data and computations. As to the actual number of teeth 184 on the tone wheel 186 and teeth 194 on the tone wheel 196, it may vary from thirty to forty teeth or more or fewer depending upon rotational speeds and sensor construction. The use of thirty-five teeth on the tone wheels has provided good results with the Hall effect sensors 180 and 190 and is therefore the presently preferred number of teeth.

The first and second Hall effect sensors 180 and 190 sense the respective adjacent teeth 184 and 194 and provide a series of pulses in the lines 182 and 192, respectively, which may be utilized to compute the instantaneous rotational speeds of the rear output shaft 58 and the front output shaft 172 which, of course, correspond to the rotational speeds and the rear drive shaft 22 and the front drive shaft 32, respectively. These rotational speeds may be utilized to infer the speed of the vehicle as well as determine overrunning by either the front or the rear drive shafts relative to the other which represents wheel spin and thus wheel slip. Hall effect sensors are preferred inasmuch as they provide an output signal which alternates between a well defined high and low signal value as the sensed teeth pass.

It will be appreciated that other sensing devices such as, for example, variable reluctance sensors may be utilized. Such sensors do not, however, provide the clean wave form provided by Hall effect sensors, particularly at low shaft speeds, and thus may require extra input conditioning to provide useable data. It should also be appreciated that the Hall effect sensors 180 and 190 and their respective adjacent teeth 184 and 194 are preferably located within the housing 46 of the transfer case assembly 16 but may be located at any convenient site along the primary and secondary drive lines 20 and 30, respectively.

Referring now to FIGS. 2, 3 and 5, the transfer case assembly 16 also includes a locking clutch assembly 200. The locking clutch assembly 200 includes a first or internal collar 202 having internal female splines or gear teeth 204 which engage complimentarily configured male splines or gear teeth 206 formed in the output shaft 58 along a central portion of its length. The output shaft 58 also includes a step or shoulder 208 which limits axial travel of the first collar 202 therealong. A thrust bearing 212 is positioned adjacent the first collar 202. The exterior of the first collar 202 includes a first plurality of gear teeth or male splines 216 which extend fully, axially across its exterior surface. Interleaved with the first set of male splines 216 are a plurality of axial, foreshortened channels or grooves 218 which extend only from the right face of the first collar 202 to approximately its midpoint. Concentrically disposed about the first collar 202 is a second or exterior clutch drive collar 222. The clutch drive collar 222 includes a pair of peripheral, circumferential ribs 224 which cooperatively define a circumferential groove 226 which, in turn, receives a shift fork 228.

The shift fork 228 is slidably disposed upon the fixed shaft 118 and includes a cam follower 232 which is received within a cam track 234 in the cylindrical cam 108.

A compression spring 236 biases the shift fork 228 to the left as illustrated in FIG. 2 and 3. A compression spring 238 is also received within the second, exterior clutch collar 222 and provides a biasing force which tends to drive apart the second clutch collar 222 and a third toothed collar 242. The third or toothed collar 242 includes a plurality of internal gear teeth or female splines 244 which are complimentary to and engage the splines 216 and foreshortened grooves 218 on the first clutch collar 202. Thus, the third clutch collar 242 enjoys limited axial motion on the first clutch collar 202, having its axial translation effectively limited by the lengths of the grooves or channels 218. A snap ring 246 engages a flange 248 on the third clutch collar 242. The snap ring 246 is received within a channel 252 formed on the interior of the second clutch collar 222. Finally, the third clutch collar 242 includes a plurality of gear teeth or male splines 254 disposed adjacent and extending axially from the flange 248. The male splines or gear teeth 254 are complimentary to, aligned with and axially engageable with or disengageable from the female splines or gear teeth 256 formed in the chain drive sprocket 162.

Part II-Electronic/Software Components

When a typical on demand four wheel drive system, that is, a system wherein a speed difference between the front and rear wheels or prop shafts which exceeds a reference value causes an inter-driveline clutch to selectively couple the two drivelines in accordance with its control parameters, is driven in deep sand and certain other off road conditions, the system may cycle randomly, transiently, and repeatedly between minimum and maximum clutch engagement and driveline coupling. In mathematical terms, the sum of the speed differences over time greatly exceeds the sum of speed differences over time of other types of driving. As noted above, this cyclic transient operation is unpleasant to the vehicle occupants and is inconsistent with the design goals of on demand vehicle torque delivery systems. Furthermore, the constant cycling of the clutch creates significant heat within the transfer case which can be deleterious to performance and service life expectancies.

In order for a control scheme of an on demand torque system to address the challenge of providing appropriately smooth and predictable operation in a vehicle driving in sand, it is first necessary to establish a detection protocol to determine when this condition exists. Generally speaking, three categories of vehicle operation and driving conditions can be defined. They are: a) normal driving conditions including occasional wheel slip and on demand operation, b) situations where one or a pair of oversized or undersized tires such as compact spare tires are mounted on the vehicle and c) operation of the vehicle in sand or similar tractive conditions. Each of these three operating conditions have distinct operating signatures which aid in the detection of the latter mode. Specifically, determination of a long term average speed difference and the number of transients or spikes over such long term, when properly conditioned, can provide an indication of which one of the three operating categories represents the current vehicle driving condition. In the foregoing statement the designation "long term" means in the range of from approximately 1 second to 30 seconds and thus is significantly longer than the operating and active response period of the on demand system which is typically measured in milliseconds.

The following Table I sets forth the characteristics of these three operating categories.

TABLE I

| DRIVING CONDITION | AVERAGE SPEED DIFFERENCE | SPEED TRANSIENTS OR SPIKES |
|---|---|---|
| Normal | Low | Few |
| Mis-sized tire or compact spare | High | Negligible |
| Sand | High | Many |

The foregoing Table I highlights the random cyclic operation of a vehicle on demand system in sand which is characterized by rapid cycling between a high speed difference between the front and rear drivelines, followed by a low speed difference after the on demand system engages, a relaxation of the on demand system followed by an abrupt high speed difference, re-engagement of the on demand system, a low speed difference, ad infinitum. Accordingly, the software and subroutines of the adaptive drive system 10 of the present invention are configured to detect this operating condition. However, it is preferred to determine experimentally the operating characteristics of each particular vehicle to determined its activity in an extreme operating environment such as sand in order to improve the capability of the control system and to differentiate between extreme conditions which override the on demand function or conditions which are not so extreme and allow the on demand function to operate conventionally.

Figure 6:
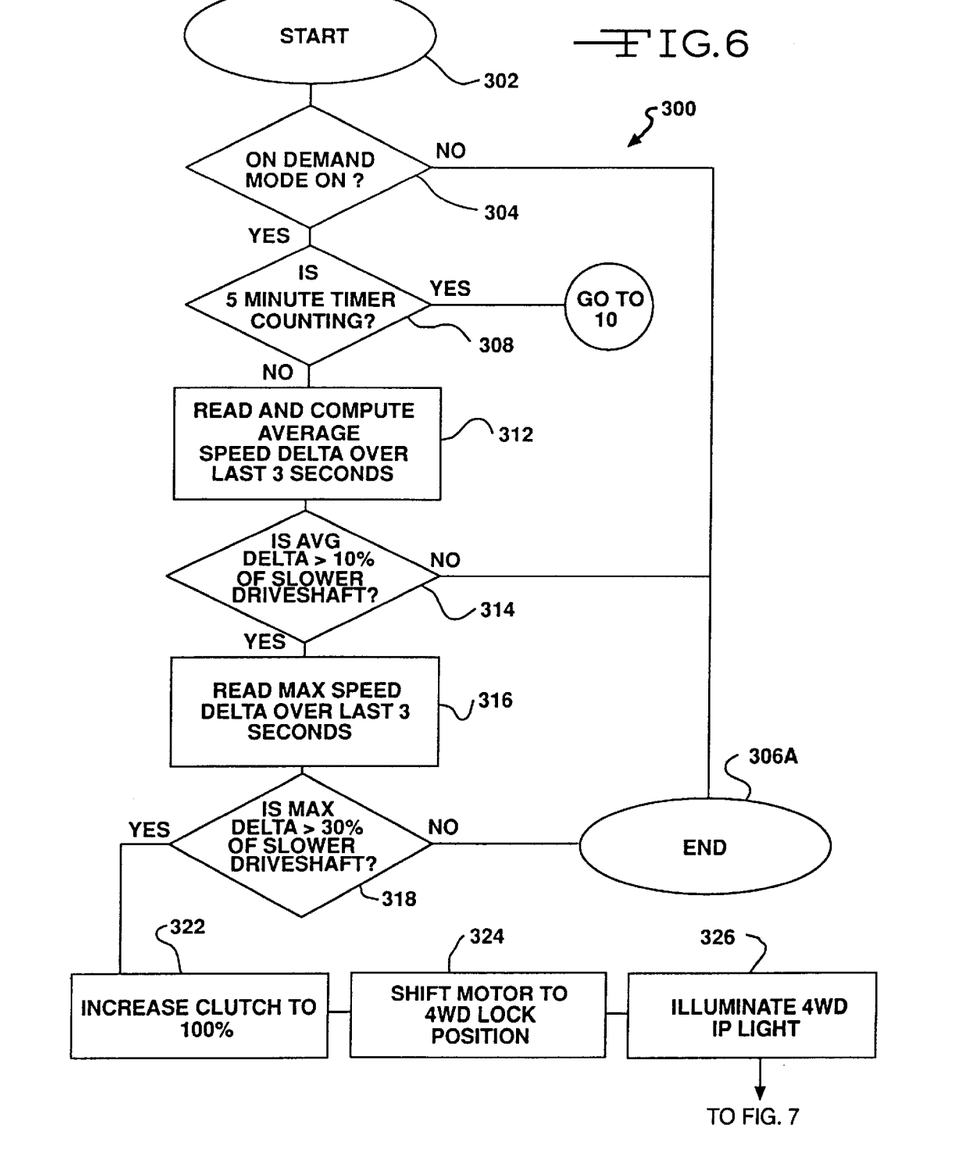
FIG. 6 is a first portion of a software program for detecting extreme off road driving conditions and controlling a vehicle torque delivery system.

Referring now to FIG. 6, a flow chart for a typical microprocessor program 300 for the detection of extreme vehicle operating conditions such as sand is illustrated. The program 300 is intended to be utilized with an on demand system such as that described in co-owned U.S. Pat. No. 5,407,024. The program 300 begins with a start command 302 which may be commanded by the executive system of the on demand vehicle controller on a relatively frequent basis such as once every one to five seconds. The program 300 then moves to a decision point 304 which determines whether the vehicle is operating in on demand torque distribution mode either by virtue of manual or automatic selection. If it is not, the program 300 immediately moves to an end step 306A and returns to the executive system. If the vehicle is in on demand torque distribution mode, the program 300 then moves to a second decision point 308 wherein a five minute countdown timer is interrogated to determine if it is already counting. If the response is yes, the program 300 branches to a decision point 310 which will be discussed subsequently.

If the five minute countdown timer is not active, the program 300 moves to a process step 312 which reads the outputs of the Hall effect sensors 180 and 190 and computes the average speed difference (delta) between the readings over the last three seconds. The program 300 then moves to a decision point 314 which compares this calculated average speed difference (delta) with a computed value representing ten percent of the slower of the two drive shafts 22 and 32. If this calculated average speed difference (delta) is less than ten percent of the speed of the slower of the two drive shafts 22 and 32, the decision point 314 is exited at NO and the program 300 moves to the end step 306A. If the calculated average speed difference (delta) for the last three seconds is greater than ten percent of the speed of the slower of the two drive shafts 22 and 32, the decision point 314 is exited at YES and the program 300 moves to a process step 316. The process step 316 determines the maximum speed difference (delta) between the two drive shafts 22 and 32 as sensed by the Hall effect sensors 180 and 190, respectively, over the last three seconds.

The program 300 then moves to a decision point 318 which compares the maximum speed difference (delta) determined in the process step 316 to a value representing thirty percent of the slower of the two drive shafts 22 and 32. If the maximum speed difference (delta) is less than thirty percent of the slower of the two drive shafts 22 and 32, the program 300 moves to the end step 306A and returns to the system. If, on the other hand, the maximum speed difference (delta) over the last three seconds is greater than thirty percent of the speed of the slower of the two drive shafts 22 and 32, the decision point 318 is exited at YES and the program 300 moves to a process step 322. The process step 322 commands an electronic PWM controller (not illustrated) to provide maximum current to the electromagnetic coil 144 such that the disc pack clutch assembly 150 fully engages. When the disc pack clutch assembly 150 is fully engaged, the torque split between the primary driveline 20 and the secondary driveline 30 is equal, that is, fifty-fifty.

Next, a process step 324 is undertaken which commands the shift motor 100 to rotate to translate the shift fork 228, the second clutch collar 222 and the third clutch collar 242 to engage the chain drive sprocket 162 such that the front or secondary output shaft 172 is directly coupled to and driven by the primary or rear output shaft 58. At this time, there is a parallel mechanical connection between the primary output shaft 58 and the secondary output shaft 172 through both the disc pack clutch assembly 150 and the locking clutch assembly 200.

The program 300 then moves to a process step 326 which illuminates an indicator light 328 (illustrated in FIG. 1) on the instrument panel of the vehicle (both not illustrated) indicating that the vehicle is in four wheel drive operating mode.

Figure 7:
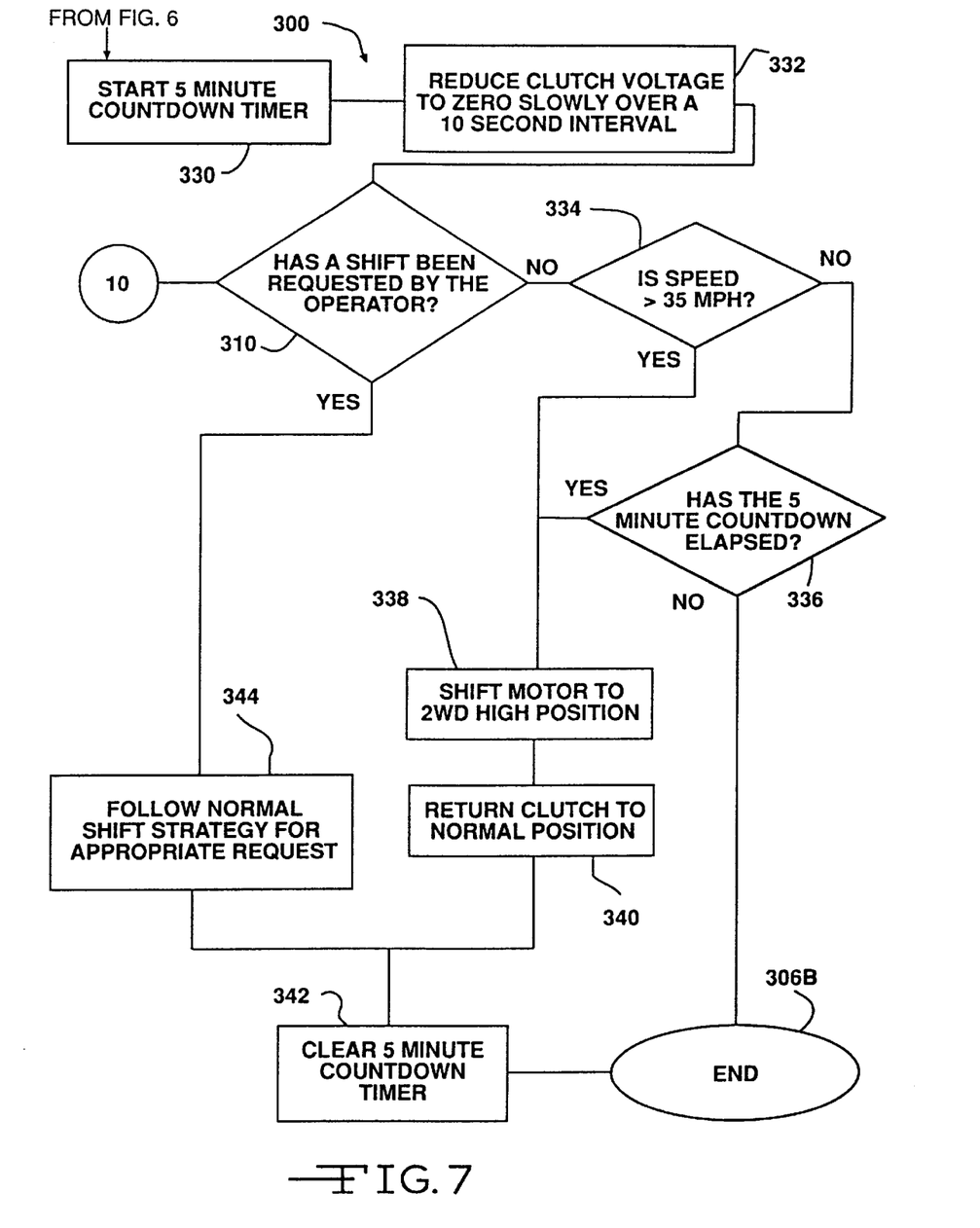
FIG. 7 is a second portion of a software program for detecting extreme off road driving conditions and controlling a vehicle torque delivery system.

Referring now to FIG. 7, the program 300 continues with another process step 330 which starts a five minute countdown timer. This is the same five minute timer referenced in decision point 308. The program 300 then moves to an additional process step 332 which slowly reduces the control voltage or duty cycle to the coil 144 of the electromagnetic clutch assembly 120 over a ten second interval. Next, a decision point 310 is entered which determines whether any shift has been requested by the vehicle operator. The decision point 310 may also be reached from decision point 308 if an affirmative response is received to the interrogation to determine if the five minute countdown timer is active. If no shift has been requested by the vehicle operator, the program 300 moves to a decision point 334 which determines whether the speed of the vehicle is greater than thirty-five miles per hour (56 kilometers per hour).

If the vehicle speed is below this threshold, the decision point 334 is exited at NO and the program 300 moves to a decision point 336 which determines whether the five minutes of the five minute countdown timer have elapsed. If they have not, the program moves to an end step 306B and returns to the system. If the five minutes of the five minute countdown timer have elapsed, the decision point 336 is exited at YES and the program 300 moves to a process step 338. Also, if in the decision point 334, it is determined that the vehicle speed is greater than the threshold speed, the decision point 334 is exited and the program 300 also moves to the process step 338. In the process step 338, the shift motor 100 is commanded to move the shift fork 116 to the left such that the clutch collar 90 directly couples the input shaft 50 to the primary output shaft 58 and the locking clutch assembly 200 releases the coupling between the primary output shaft 58 and the chain drive sprocket 162. Thus the vehicle is returned to two wheel drive high on demand operation. In the next process step 340, the electromagnetic clutch assembly 120 is returned to its normal on demand operation. Finally, the program 300 moves to a process step 342 which clears the five minute timer, preparatory to a subsequent five minute countdown, cycles to the end step 306B and returns to the executive control system.

Returning to the decision point 310, if a shift has been requested by the vehicle operator, the program 300 branches to a process step 344. The process step 344 commands the control scheme of the vehicle on demand system to follow the normal strategy for the requested shift. If the shift requested is appropriate it is carried out. If the shift request is inappropriate it will typically be ignored. Again, these steps are under the control of the vehicle on demand system. After the shift request is processed in step 344, the program 300 moves to the process step 342, clears the five minute countdown timer and moves to end step 306B.

It should be appreciated that the precise sequence of steps in the foregoing program 300 as well as the numerical values such as the five minute countdown timer, the 35 mile per hour threshold, the 10 second modulating clutch voltage/engagement reduction period, the three second period for averaging speed, the ten percent average speed difference threshold and thirty percent transient speed difference threshold are presented as illustrative and explanatory examples and are not to be considered as limiting of the foregoing invention. These values may and typically will be adjusted over a range of plus or minus fifty percent and perhaps a wider range in order to adapt to the weight, weight distribution, traction, time constants, torque and torque distribution characteristics of a particular vehicle. In fact, the invention may properly be considered to be the combination of hardware, that is, a transfer case having both a modulating and lockup clutch and electronic circuitry and software capable of detecting the rapid, repeated average and transient speed differences associated with operation of a vehicle on demand drive system in sand and generating control signals which sequentially engage the modulating clutch and the lockup clutch, allow the modulating clutch to relax and, after a predetermined period of time, release the lockup clutch and return to normal, on demand, operation.

The foregoing disclosure is the best mode devised by the inventor for practicing this invention. It is apparent, however, that devices and methods incorporating modifications and variations will be obvious to one skilled in the art of on demand vehicle drive systems. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

I claim:

1. A method of operating a vehicle drive system comprising the steps of:

sensing and providing a first signal representing a first speed of a first drive line, sensing and providing a second signal representing a second speed of a second drive line, determining an average and an instantaneous speed difference between said first speed signal and said second speed signal over a predetermined time period, determining a speed of a slower of said two speeds, comparing said average and said instantaneous speed differences to said speed of said slower of said two speeds, and sequentially providing a first output signal to a modulating clutch and a second output signal to a lock up clutch in response to both said average speed difference and said instantaneous speed difference exceeding respective predetermined values related to said speed of said slower of said two sensed speeds.

2. The method of claim 1 wherein said modulating clutch and said lock up clutch operably couple said first and said second drive lines.

3. The method of claim 1 wherein said predetermined time period is five minutes.

4. The method of claim 1 wherein said average speed difference is between 5 percent and 15 percent of said slower of said two sensed speeds.

5. The method of claim 1 wherein said maximum instantaneous speed difference is between 15 percent and 45 percent of said slower of said two sensed speeds.

6. The method of claim 1 wherein said modulating clutch is disengaged after a period of approximately five minutes.

7. The method of claim 1 wherein said determining and comparing steps are achieved by a microcontroller.

8. The method of claim 1 further including the step of providing a transfer case operably disposed between said drive lines and including said clutches.

9. A method of operating a vehicle drive system comprising the steps of:

provicing a first signal representing a first speed of a first motor vehicle drive line, providing a second signal representing a second speed of a second motor vehicle drive line, determining an average and an instantaneous speed difference between said first speed signal and said second speed signal over a predetermined time period, determining a speed of a slower of said two speeds, comparing said average and said instantaneous speed differences to said speed of said slower of said two speeds, and providing a first output signal adapted to ramp up a modulating clutch and a second output signal adapted to engage a lock up clutch in response to both said average speed difference and said instantaneous speed difference exceeding respective predetermined values related to said speed of said slower of said two sensed speeds.

10. The method of claim 9 wherein said modulating clutch and said lock up clutch operably couple said first and said second drive lines.

11. The method of claim 9 wherein said predetermined time period is five minutes.

12. The method of claim 9 wherein said average speed difference is between 5 percent and 15 percent of said slower of said two sensed speeds.

13. The method of claim 9 wherein said maximum instantaneous speed difference is between 15 percent and 45 percent of said slower of said two sensed speeds.

14. The method of claim 9 wherein said modulating clutch is disengaged after a period of approximately five minutes.

15. The method of claim 9 wherein said determining and comparing steps are achieved by a microcontroller.

16. A method of operating a vehicle drive system comprising the steps of:

sensing a first signal representing a first speed of a first drive line, sensing a second signal representing a second speed of a second drive line, providing a microcontroller which receives said first and said second signals and determines an average and an instantaneous speed difference between said first speed signal and said second speed signal over a predetermined time period, determines a speed of a slower of said two of said sensed speeds, compares said average and said instantaneous speed differences to said speed of said slower of said two sensed speed, and provides a first output signal to a modulating clutch and a second output signal to a lock up clutch in response to both said average speed difference and said instantaneous speed difference exceeding respective predetermined values related to said speed of said slower of said two sensed speeds.

17. The method of claim 16 wherein said modulating clutch and said lock up clutch operably couple said first and said second drive lines.

18. The method of claim 16 wherein said predetermined time period is five minutes.

19. The method of claim 16 wherein said average speed difference is between 5 percent and 15 percent of said slower of said two sensed speeds.

20. The method of claim 16 wherein said maximum instantaneous speed difference is between 15 percent and 45 percent of said slower of said two sensed speeds.

* * * * *